Nov. 15, 1966  N. C. PETERSON ET AL  3,286,120
VELOCITY TAPERING OF TRAVELING WAVE TUBE CYLINDRICAL
DELAY LINE BY USE OF NONUNIFORM SUPPORT ROD
Filed July 9, 1964
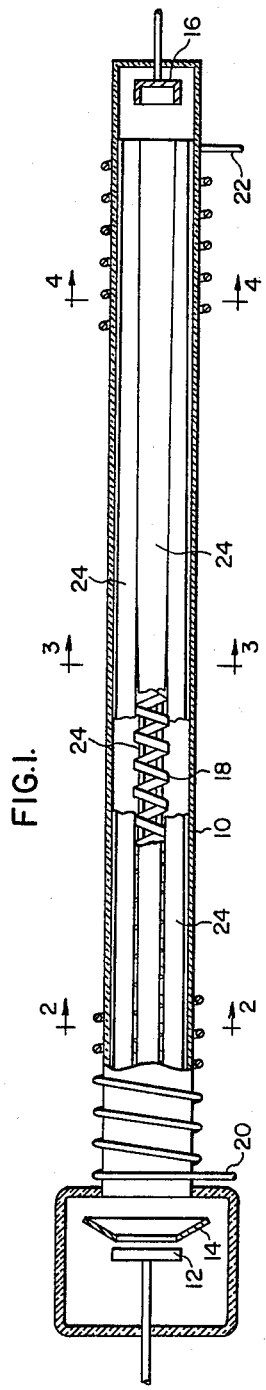
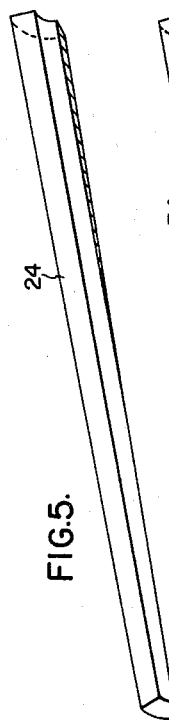
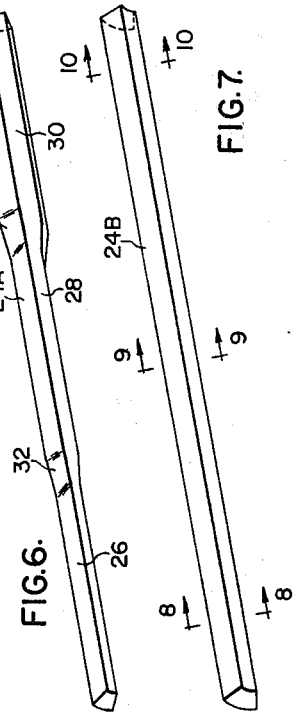
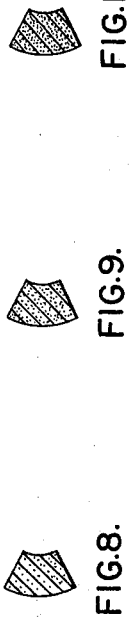
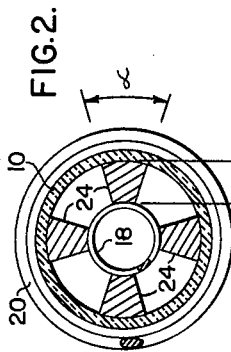
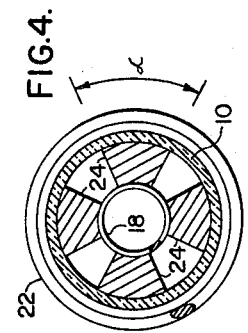
INVENTORS
Noel C. Peterson
& John M. Scott
BY Charles F. Renz
ATTORNEY

United States Patent Office 3,286,120
Patented Nov. 15, 1966

3,286,120
VELOCITY TAPERING OF TRAVELING WAVE TUBE CYLINDRICAL DELAY LINE BY USE OF NONUNIFORM SUPPORT ROD
Noel C. Peterson, Severna Park, and John M. Scott, Linthicum Heights, Md., assignors to Westinghouse Electric Corporation, Pittsburgh, Pa., a corporation of Pennsylvania
Filed July 9, 1964, Ser. No. 381,505
3 Claims. (Cl. 315—3.6)

This invention relates to traveling wave tubes, and more particularly to the tapering or variation of phase velocity in such tubes.

It has been previously proposed, as a broad proposition, to enhance the interaction efficiency of traveling wave tubes by tapering (gradually reducing) the phase velocity of the "circuit" to maintain synchronism and maximum coupling between the decelerating electron beam and the R.F. energy propagated along the slow wave structure. In traveling wave tubes which employ a single helix as the slow wave line, velocity tapering can be achieved by varying the pitch (turns per unit length) of the helix. This involves decreasing the turn-to-turn spacing as the output end of the helix is approached. However, where this spacing is already quite small, as is usually the case, further reduction is difficult or impractical. Moreover, with complicated slow wave lines, such as the ring-bar type or the cross-wound helix type, variation of the phase velocity by modification of the slow wave line per se is not a simple matter.

It has previously been proposed to provide the desired phase velocity taper by inserting within the body or housing which normally surrounds the slow wave line a member having varying position with respect to the slow wave line along its length. However, the interposition of such a member between the housing and the slow wave line makes it difficult to support the line and provides no means for dissipating heat, so that a rugged, high power tube cannot be provided.

It is accordingly a principal object of the present invention to provide improved means for controlling, varying, or tapering the phase velocity of the circuit of a traveling wave tube or the like.

A further object of the invention is to provide apparatus for the foregoing purpose which may be utilized with diverse slow wave structures without modification of the line conductor per se or the housing and which improves tube efficiency in a simple and economical manner.

Still another object of the invention is to provide apparatus of the foregoing type which readily varies phase velocity continuously or in steps.

Briefly stated, the present invention is concerned with a special construction of the support structure for the slow wave line, so as to provide variation of dielectric loading along the line.

The foregoing, and other objects, advantages and features of the invention, and the manner in which the same are accomplished will become more readily apparent upon consideration of the following detailed description of the invention taken in conjunction with the accompanying drawings, which illustrate preferred and exemplary embodiments of the invention, and wherein:

FIGURE 1 is a somewhat diagrammatic longitudinal sectional view of a traveling wave tube in accordance with an embodiment of the invention;

FIGS. 2, 3 and 4 are successive transverse sectional views taken along lines II—II, III—III and IV—IV of FIG. 1;

FIGS. 5, 6 and 7 are perspective views of different embodiments of a supporting rod in accordance with the invention; and FIGS. 8, 9 and 10 are successive transverse sectional views taken along lines VIII—VIII, IX—IX and X—X of FIG. 7.

Referring to the drawings, and initially to FIG. 1 thereof, a traveling wave tube in accordance with the invention comprises a conventional enevelope 10, which may be of glass, ceramic or metal material, for example, and which may constitute the body or housing for the slow wave structure or may enclose a separate body or housing of metal, for example. The tube also comprises a conventional cathode 12, accelerating electrode 14, collector or target electrode 16, and focusing means (not shown) which are positioned, shaped and energized in a conventional manner for projecting an electron beam from the cathode 12 to the collector 16 along the longitudinal axis of the tube. The tube further comprises a slow wave structure or suitable delay line 18 capable of being supported by dielectric rods to be described hereinafter. In the form shown the delay line 18 is a wire or tape helix which extends along the length of the tube coaxial with the housing or envelope 10 in the usual manner. Any suitable input and output couplings to and from the slow wave structure 18 may be employed. An input connection 20 and an output connection 22 are illustrated as helical coils surrounding the input and output ends of the envelope. Wave guides or other suitable couplings may also be employed.

The slow wave structure 18 is spaced from and supported within the housing 10 by means of a dielectric supporting structure, which comprises a plurality of dielectric rods 24 spaced about the periphery of the slow wave structure 18 and extending along its length, there being four equi-spaced rods 24 in the illustrated embodiment. These rods 24 may be formed of glass, sapphire, or ceramic material, for example. The dielectric rods 24 are of sectoral cross section (see FIG. 2) the sides of the rods 24 defining included angles α. The inner and outer edges of the rods are shaped to provide firm contact with the outer contours of the slow wave structure 18 and the inner contours of the housing 10. Thus, in the specific form shown these inner and outer edges are coaxial cylindrical surfaces.

In accordance with the invention the phase velocity along the slow wave structure 18 is tapered by variation of the dielectric loading imposed upon the line 18 by the supporting rods 24. To maintain synchronism between the electrons of the electron beam projected from cathode 12 through the helix 18, without variation of the helix pitch, which is kept uniform rods 24 are themselves tapered so as to reduce the phase velocity of the R.F. energy in approaching the output end of the traveling wave tube. The reduction in phase velocity may be gradual throughout the length of the tube, or throughout a portion of the length, or may be in discrete steps. As is apparent from FIGS. 1 to 5, in one embodiment the taper is achieved by increasing the angle α proceeding from the input end of the tube toward the output end, while maintaining the radial projection of the rods 24 constant.

FIG. 6 illustrates a rod embodiment 24A including three steps 26, 28 and 30 of increasing angle α. These steps may be joined by tapered transitions 32 and 34, for example.

FIG. 7 illustrates an embodiment of rod 24B in which the angle α is uniform, but in which the dielectric constant of the rod is varied along its length by modification of the material of the rod. See FIGS. 8 to 10. This modification may be gradual or in steps, and may be accomplished, for example, by progressive loading of a suitable dielectric matrix material such as silica with a suitable impurity such as lead oxide or by joining successive sections of material having different dielectric constant such as beryllia, alumina, zirconia and silica.

By virtue of the invention it is possible to support the slow wave structure in a simple and effective manner, and in a manner which permits ready heat transfer from the slow wave structure to the housing, but which nevertheless provides the desired variation in phase velocity.

While preferred embodiments of the invention have been shown and described, it will be apparent to those skilled in the art that modifications can be made without departing from the principles and spirit of the invention. For example, variation in dielectric loading may be achieved by modification of the shape or dielectric constant of the supporting structure, as set forth above, or by a combination of both aspects of the invention. Accordingly, the foregoing embodiments of the invention are to be considered illustrative, rather than restrictive of the invention.

We claim as our invention:

1. A traveling wave tube having a tubular housing with a slow wave structure therein, a support structure supporting said slow wave structure within said housing, said housing being tubular, said slow wave structure having a generally cylindrical configuration and being substantially coaxial with said housing, said support structure comprising a plurality of dielectric rods spaced along the periphery of said slow wave structure, extending along the length of said slow wave structure and interposed between said slow wave structure and said housing to provide uniform spacing between said housing and said slow wave structure, said dielectric rods providing varying dielectric loading to said slow wave structure along at least a portion of their length.

2. The tube of claim 1, said dielectric rods having a substantially sectoral cross section with the included angle of the sector cross section increasing toward the output end of said slow wave structure.

3. The tube of claim 1 in which said dielectric rods comprise a material having an effective dielectric constant which increases along the rods towards the output end of said slow wave structure.

References Cited by the Examiner
UNITED STATES PATENTS

| | | | |
|---|---|---|---|
| 2,794,143 | 5/1957 | Warnecke et al. | 315—3.5 |
| 2,825,841 | 3/1958 | Convert | 315—3.5 |
| 2,941,112 | 6/1960 | Webber | 315—3.5 |
| 2,943,228 | 6/1960 | Kleinman | 315—3.5 |
| 2,948,828 | 8/1960 | Ashkin | 315—3.6 |

HERMAN KARL SAALBACH, *Primary Examiner.*

P. L. GENSLER, *Assistant Examiner.*